Nov. 28, 1967    D. H. LACKOWSKI    3,355,712
MAGNETIC SHAFT-TO-DIGITAL ENCODER READOUT BUFFER
Filed Sept. 11, 1964    3 Sheets-Sheet 1

INVENTOR.
DONALD H. LACKOWSKI
BY
ATTORNEYS

United States Patent Office 3,355,712
Patented Nov. 28, 1967

3,355,712
MAGNETIC SHAFT-TO DIGITAL ENCODER
READOUT BUFFER
Donald H. Lackowski, San Diego, Calif., assignor to the
United States of America as represented by the Secretary of the Navy
Filed Sept. 11, 1964, Ser. No. 395,966
5 Claims. (Cl. 340—172.5)

ABSTRACT OF THE DISCLOSURE

A buffering circuit for controlling the flow of digital data from a sampling device to a data processor. The circuit is capable of storage of the data samples for a limited time interval but does not require any sophisticated memory devices.

The circuit is controlled by normally available command and acknowledge signals from the processor and is particularly disclosed for operation with a digital shaft position encoder.

The invention described herein may be manufactured and used by or for the Government of the United States of America for governmental purposes without the payment of any royalties thereon or therefor.

The present invention relates to an encoder readout buffer and more particularly to a shaft to digital encoder readout buffer and specifically to a magnetic, U-scan logic, shaft to digital encoder readout buffer having sample and hold characteristics.

In a typical digital system, the data processor does not continuously process the encoder data, but rather, at discrete instance of time, samples and processes the encoder output. In most data processors, the data sample presented for processing must remain static for a certain period of time. In a typical digital to analog converter, for example, the digital input must remain static for a period of time at least as long as the convert time of the converter.

Therefore, in order to insure proper receipt of the data sample, the encoder output must remain constant during the sample period. However, the encoder cannot be stopped in a dynamic system during each sampling period; consequently a device with sample and hold characteristics is required between the encoder and the data processor.

An object of the present invention is to provide a practical shaft-to-digital encoder readout buffer.

A further object of the invention is to provide a magnetic shaft-to-digital encoder readout buffer which insures proper receipt of a data sample.

Another object of the invention is to provide an encoder readout buffer having sample and hold characteristics so that the encoder output remains constant during the sample period.

A further object of the invention is to provide an encoder readout buffer such that the addition of relatively few logic components to the basic logic is required.

Other objects and many of the attendant advantages of this invention will be readily appreciated as the same becomes better understood by reference to the following detailed description when considered in connection with the accompanying drawings wherein.

Figure 1:
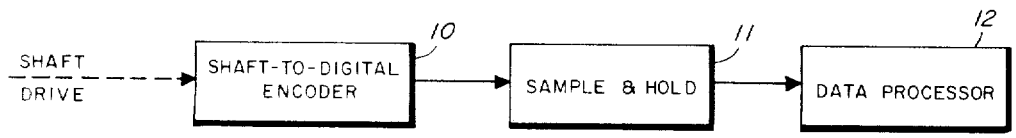
FIG. 1 is a block diagram of a typical encoder application.

The function of the buffer of the present invention may be more readily understood by considering FIG. 1, a representation of a typical magnetic shaft-to-digital encoder application. A shaft-to-digital encoder 10 converts its shaft position to a digital signal which is to be transmitted to a data processor 12. The data processor may process the digital signal in any number of ways depending on the nature of the overall system. Thus, the data processor 12 may represent a computer, a digital to analog converter, etc. As previously stated, the data processor does not continuously process the encoder data in a typical digital system, but rather, at discrete instances of time, samples and processes encoder output. In most data processors the data sample presented for processing must remain static for a certain period of time.

Therefore to insure proper receipt of the data sample, the encoder output must remain static during the sample period. In that the encoder cannot be stopped in a dynamic system during each sampling period; a buffer 11 having sample and hold characteristics is provided.

The buffer 11 will, upon the receipt of a command signal from a data processor, provide to the data processor a static digital word identical to the output of the encoder at the instant the command is received. The technique utilized takes advantage of the characteristics of a U-scan logic encoder in such a way that the sample and hold function is carried out by modification of the basic U-scan logic rather than by adding a register or other extensive components to the basic U-scan logic components.

In a U-scan magnetic encoder, the least significant bit (LSB) output is obtained from a single head on the encoder, while every other bit is derived from two heads, a lead-head and a lag-head.

Figure 3:
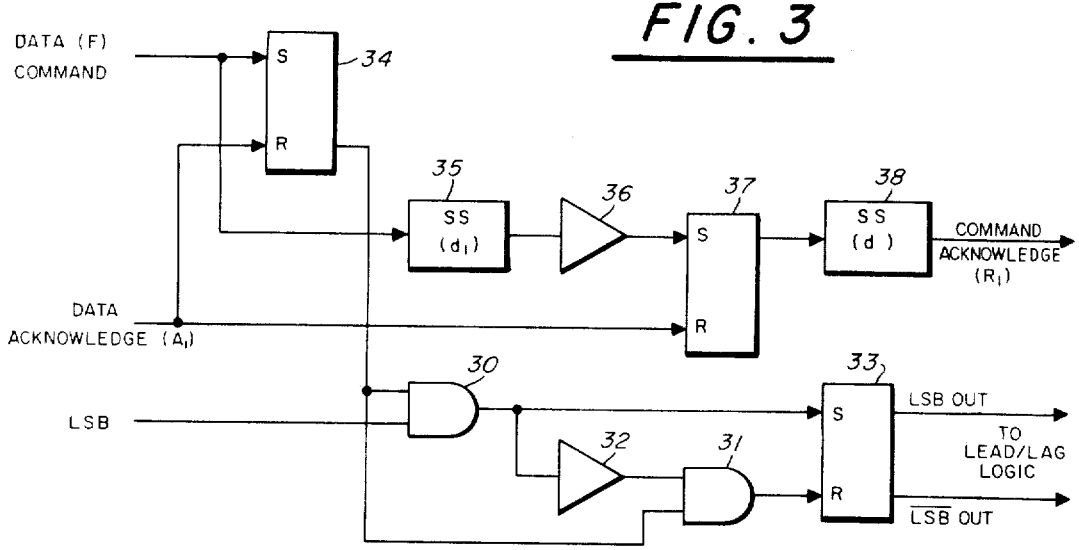
FIG. 3 is a schematic diagram of the magnetic shaft-to-digital encoder readout buffer of this invention.

The circuit described in FIG. 3 is designed for digital words in parallel, binary form and consequently all digital words will be assumed to be in parallel, binary form. The purpose of the lead-head/lag-head combination is to eliminate skew in the output word caused by imperfect mechanical alignment in encoder parts. Using the lead/lag logic scheme, the LSB gates all subsequent bits such that a change of state of any bit takes place only when the LSB is also changing state.

Figure 2:
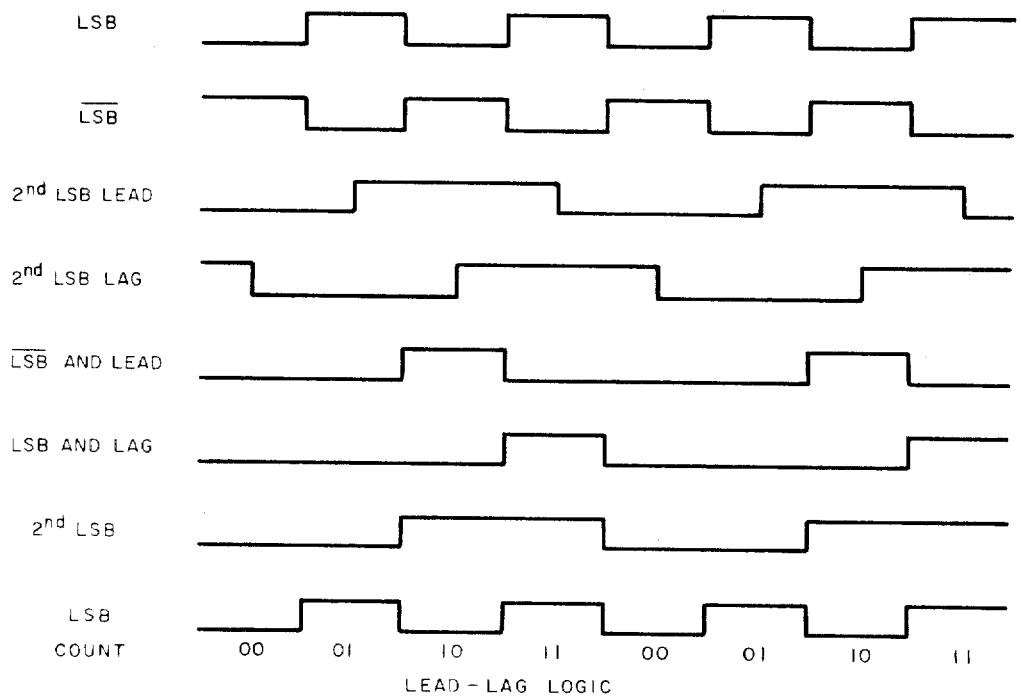
FIG. 2 is a diagram of the lead-lag logic of a magnetic shaft-to-digital encoder.
Figure 2A:
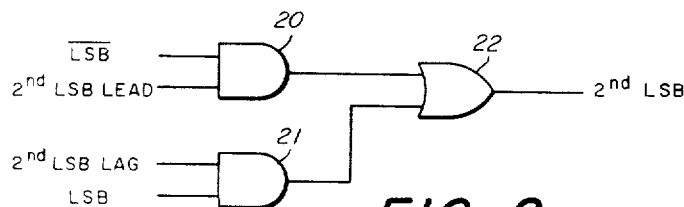
FIG. 2A is a schematic diagram of the implemented logic.

FIG. 2A illustrates the logic diagram of the lead/lag logic used for the second LSB. The circuitry comprises AND gates 20 and 21 which have their outputs coupled through an OR gate 22. One input to AND gate 20 comprises the second least significant bit lead head output and the other input comprises the inverted least significant bit ($\overline{\text{LSB}}$). The inputs to AND gate 21 comprise the lag-head output corresponding to the second least significant bit and the LSB. The output from the OR gate 22 comprises the second least significant bit.

FIG. 2 is the accompanying time diagram for the circuit of 2A and demonstrates with respect to time, how the logic functions so as to eliminate skew. The logic for bits more significant than the second least significant bit is identical.

In a U-scan encoder, the change of state of any lead or lag-head is held within a certain tolerance before or after an LSB change of state by mechanically aligning encoder parts within strict tolerances. This tolerance is usually stated as a percentage of the LSB pulse duration with the encoder shaft rotating at constant speed. Examination of the lead/lag logic of FIG. 2 reveals that, if the LSB and $\overline{\text{LSB}}$ are held constant at any time $t_1$ i.e. LSB and $\overline{\text{LSB}}$ are clamped at time $t_1$ to their respective levels at time $t_1$, the output of the lead/lag logic will not change state in less time after $t_1$ than the time difference between a change of state of the lead or lag-head and a change of state of the LSB. As set forth in the preceding paragraph, this time, designated $t_d$ is held between certain limits. Let $t_m$ represent the minimum tolerance. Then, if LSB and $\overline{LSB}$ are clamped at time $t_1$, the output of the lead/lag logic cannot change state before time $t_1+t_d$.

$t_d$ and consequently $t_m$, are expressed as a fraction of the pulse duration of the LSB with the encoder shaft rotating at constant speed. In terms of time then, $t_m$ is inversely proportional to encoder shaft speed.

In many applications, the minimum encoder shaft speed is such that $t_m$ is considerably longer than the period of time during which the sample input to the data processor must remain static. For example, in the encoder application to which the invention applied, the maximum encoder shaft speed was 30° per second which corresponded to a $t_m$ of 550 μsecs. The required hold time in this application was only about 100 μsec.

Figure 4:
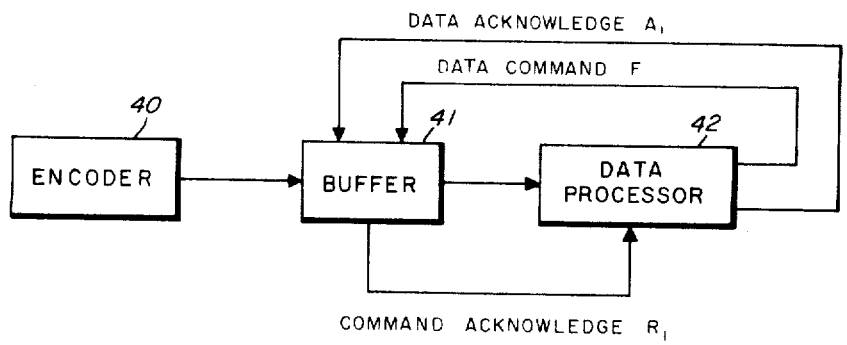
FIG. 4 is a flow diagram illustrating the use of the buffer in an encoder and computer application.

FIG. 4 illustrates the flow diagram with respect to a buffer 41, encoder 40 and data processor 42. In operation, a data command pulse F is sent from the data processor 42 to the buffer 41 as a command telling the buffer to provide a sample to the processor.

Command acknowledge $R_1$ is returned to the data processor to indicate that the encoder has been sampled and that the sample is being held static.

A data acknowledge $A_1$ is sent from the data processor to the sample buffer to indicate to the buffer that the data has been received and need not be held static any longer.

The schematic diagram of FIG. 3 implements the flow diagram of FIG. 4 wherein the data command F is coupled to the set side of a flip-flop 34 and also coupled as an input to a one shot multivibrator 35. The output of the multivibrator 35 is coupled through an inverter 36 to the set input of another flip-flop 37. The one output of flip-flop 37 is then coupled through a one shot 38 to the data processor as a command acknowledge $R_1$.

A data acknowledge $A_1$ from the processor, after the data processor has accepted the data, is coupled to the reset lines of flip-flops 34 and 37.

The LSB from the encoder is coupled as one input to AND gate 30. The other input comprises the reset output of flip-flop 34. The output of AND gate 30 is coupled to the set side of a flip-flop 33 and also coupled through an inverter 32 as one input to an AND gate 31. The other input to AND gate 31 also comprises the reset output of flip-flop 34. The output of AND gate 31 is coupled to the reset side of flip-flop 33. The set output of flip-flop 33 corresponds to the LSB out while the reset output corresponds to the $\overline{LSB}$ out. These two outputs are then coupled to the lead/lag logic as the enabling inputs for the subsequent logic.

When the data processor is ready to receive data a data command F sets flip-flop 34 to "1" and therefore a "0" appears at the inputs to AND gates 30, 31 which disables the gates. The same data command F is also coupled through one shot 35 and inverter 36 to the set input of flip-flop 37 which produces a "1" at the output of the flip-flop which is coupled through the other one shot 38 to the computer as the command acknowledge $R_1$.

In that AND gates 30 and 31 are disabled the LSB is frozen, which freezes the lead/lag logic so that the last encoder output is held constant and may be sampled in a static condition. The encoder output will remain frozen or static for a length of time at least as long as the time $t_m$ as discussed above.

When the data has been read in to the data processor the data acknowledge $A_1$ is coupled to the reset line of flip-flops 34 and 37 which resets the two flip-flops and a "1" appears at the output of flip-flop 34 on the reset line and a "0" at the output of flip-flop 37 on the set line.

The "1" output of flip-flop 34 enables AND gates 30 and 31 and the data sample pulse, i.e., the LSB out and the $\overline{LSB}$ out are then exactly the same as the LSB and $\overline{LSB}$, i.e., they are no longer frozen.

Figure 3A:
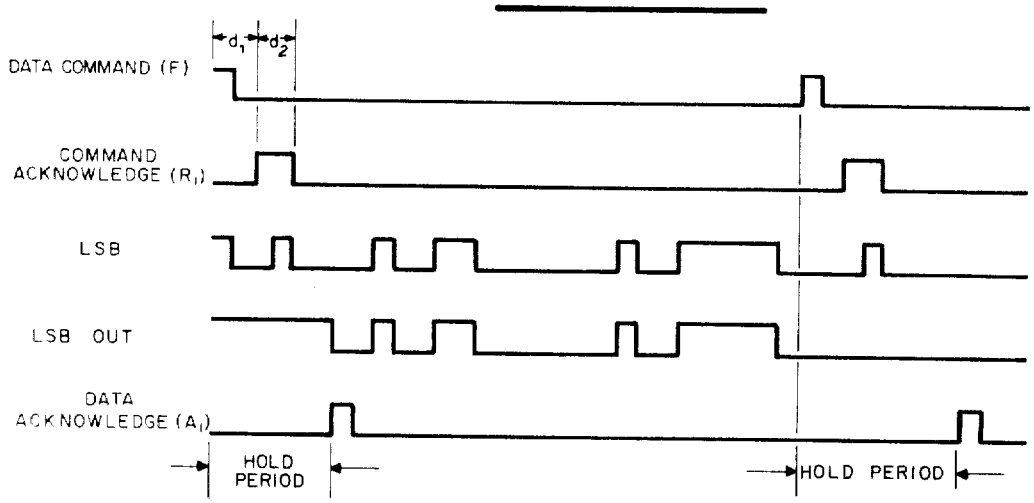
FIG. 3A is the timing diagram showing the relationship of the various signals in the circuit of FIG. 3.

The timing diagram of FIG. 3A illustrates a particular time sequence in which the operation of FIG. 3 takes place and is believed to be self-explanatory.

In that the LSB output is used as the enabling pulse for all of the remaining channels of the encoder, i.e., two channels per bit, the outputs of the remaining channels can be frozen for a certain length of time by freezing the LSB channel.

By referring to the time diagram of FIG. 3A, it is seen that before receipt of the data command F, LSB out is identical to the LSB and the lead/lag logic performs normally. Between receipt of command F at time $t_1$ and receipt of $A_1$, the LSB out is clamped to the value of LSB at time $t_1$ and $\overline{LSB}$ out is likewise clamped. Therefore, during a period of time corresponding to a hold period, the sample-and-hold output remains static, provided the period does not exceed $t_m$. Upon receipt of $A_1$, the LSB out is immediately set to the state of LSB in and remains in the same state as the LSB until receipt of the next command.

Through the use of the present invention a practical magnetic shaft-to-digital readout buffer having sample and hold characteristics is provided which allows the data sample presented for processing to remain static for a certain period of time.

Obviously many modifications and variations of the present invention are possible in the light of the above teachings. It is therefore to be understood that within the scope of the appended claims the invention may be practiced otherwise than as specifically described.

What is claimed is:

1. A digital encoder readout buffer for use in conjunction a magnetic shaft-to-digital encoder and a data processor;

said data processor providing outputs corresponding to a data command signal F and a data acknowledge signal $A_1$;

said signal F corresponding to an order to the buffer to provide a data sample;

said signal $A_1$ corresponding to an acknowledgment that data has been received by said processor;

said buffer providing outputs corresponding to a command acknowledgment signal $R_1$ and an enabling output for encoder use;

said signal $R_1$ corresponding to a reply to the data processor that the encoder has been sampled and is being held static;

the buffer having couple-and-hold characteristics; and a flip-flop having inputs and outputs;

signal F being connected to one of said inputs;

signal $A_1$ being connected to another of said inputs;

coincidence means operatively receiving an output from said flip-flop;

said flip-flop providing an inhibit pulse to said coincidence means when signal F is present and an enabling pulse when signal $A_1$ is present;

said coincidence means operatively receiving an input from the encoder;

said coincidence means being operative to produce said enabling output for encoder use when the input from the encoder and the enabling output from the flip-flop are present;

another flip-flop having inputs and outputs;

signal F being operatively coupled to one of said inputs on said another flip-flop;

an output from said another flip-flop corresponding to signal $R_1$ when signal F is present at one of said inputs to said another flip-flop.

2. A digital encoder buffer as set forth in claim 1 and further including;

delay means operatively coupled between said signal F and one of said inputs on said another flip-flop.

3. A digital encoder readout buffer as set forth in claim 2 and further including;

another delay means operatively coupled in series with an output from said another flip-flop so that said signal corresponding to $R_1$ is delayed a predetermined amount.

4. A digital encoder readout buffer as set forth in claim 1 wherein;

said first mentioned flip-flop is an RS flip-flop; and signal F is connected to the reset input;
signal $A_1$ is connected to the reset input;
said output from said flip-flop is taken from the reset side and coupled to said coincidence means.

5. A digital encoder readout buffer as set forth in claim 4 wherein;

said input from the encoder comprises the least significant bit and further including;
a third flip-flop;
said third flip-flop being an RS flip-flop;
said coincidence means comprising a pair of AND gates;
the least significant bit being coupled as an input to one of said AND gates;
the output of said one of said AND gates being coupled to the set side of said third flip-flop;
the output from the other of said pair of AND gates being coupled to the reset side of the third flip-flop;
the output of said third mentioned flip-flop corresponding to the least significant bit out;
and the reset output of the third mentioned flip-flop corresponding to the inverted least significant bit output.

References Cited

UNITED STATES PATENTS

| | | | |
|---|---|---|---|
| 2,922,990 | 1/1960 | Anderson | 340—174 |
| 2,953,777 | 9/1960 | Gridley | 340—347 |
| 3,146,424 | 8/1964 | Peterson | 340—172.5 |
| 3,156,899 | 11/1964 | Reich | 340—172.5 |

PAUL J. HENON, *Primary Examiner.*

I. S. KAVRUKOV, *Assistant Examiner.*